(12) United States Patent
Asano

(10) Patent No.: US 11,931,837 B2
(45) Date of Patent: Mar. 19, 2024

(54) RING ASSEMBLY METHOD AND MANUFACTURING METHOD

(71) Applicant: TOYOTA JIDOSHA KABUSHIKI KAISHA, Toyota (JP)

(72) Inventor: Junji Asano, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/006,202

(22) PCT Filed: Jul. 7, 2021

(86) PCT No.: PCT/JP2021/025553
§ 371 (c)(1),
(2) Date: Jan. 20, 2023

(87) PCT Pub. No.: WO2022/038911
PCT Pub. Date: Feb. 24, 2022

(65) Prior Publication Data
US 2023/0311253 A1    Oct. 5, 2023

(30) Foreign Application Priority Data
Aug. 21, 2020   (JP) .................................. 2020-139784

(51) Int. Cl.
*B23P 19/02*   (2006.01)
*B25B 27/28*   (2006.01)

(52) U.S. Cl.
CPC .................................... *B23P 19/02* (2013.01)

(58) Field of Classification Search
CPC ........ B23P 19/02; B23P 19/084; B25B 27/28; F16J 15/3272; F16J 15/3268; F16J 15/3464
See application file for complete search history.

(56) References Cited

U.S. PATENT DOCUMENTS

| | | | |
|---|---|---|---|
| 2007/0067978 A1* | 3/2007 | Relan | B23P 19/084 29/451 |
| 2009/0243224 A1* | 10/2009 | Shimazu | B29C 45/0046 264/334 |
| 2013/0047405 A1* | 2/2013 | Yamanaka | F16J 15/3268 29/450 |

FOREIGN PATENT DOCUMENTS

| | | | |
|---|---|---|---|
| CN | 2863370 Y | * | 1/2007 |
| CN | 105364776 A | * | 3/2016 |

(Continued)

OTHER PUBLICATIONS

International Search Report dated Sep. 28, 2021 in PCT/JP2021/025553 filed on Jul. 7, 2021, 2 pages.

*Primary Examiner* — Bayan Salone
(74) *Attorney, Agent, or Firm* — Oblon, McClelland, Maier & Neustadt, L.L.P.

(57) ABSTRACT

A process of setting a front end-side retaining ring at a small diameter part of a ring temporary holding jig. A process of causing the ring temporary holding jig to temporarily hold the front end-side retaining ring by using a first ring press member. A process of attaching the ring temporary holding jig to a shaft. A process of transferring the front end-side retaining ring from a large diameter part of the ring temporary holding jig to a first outer peripheral surface of the shaft by using a second ring press member including a dimension shorter than a dimension of the first ring press member. A process of sliding the front end-side retaining ring on the first outer peripheral surface of the shaft to assemble the front end-side retaining ring in the ring groove by using the second ring press member.

12 Claims, 14 Drawing Sheets

(56) References Cited

FOREIGN PATENT DOCUMENTS

| JP | 09108959 A | * | 4/1997 | |
|----|----|----|----|----|
| JP | 2015-182183 A | | 10/2015 | |
| JP | 2015182183 A | * | 10/2015 | ............. B25B 27/02 |
| JP | 7164254 B1 | * | 11/2022 | |
| WO | WO 2016031582 A1 | * | 3/2016 | |
| WO | WO-2016031582 A1 | * | 3/2016 | ............. B23P 19/02 |
| WO | WO-2022191274 A1 | * | 9/2022 | |

\* cited by examiner

FORWARD      REARWARD

RING ASSEMBLY METHOD AND MANUFACTURING METHOD

TECHNICAL FIELD

The present disclosure relates to a ring assembly method and a manufacturing method.

BACKGROUND ART

Patent Literature 1 discloses a method for mounting a seal ring to a groove part formed on an outer peripheral surface of a shaft. Specifically, a ring mounting jig having a tapered outer peripheral surface is mounted on a leading end of the shaft, and the seal ring is gradually deformed to expand its diameter by being slid on the tapered outer peripheral surface. The deformed seal ring with the expanded diameter is moved on the outer peripheral surface of the shaft, and when the seal ring eventually reaches the groove part, the diameter of the seal ring is reduced due to deformation and the seal ring is mounted in the groove part.

CITATION LIST

Patent Literature

Patent Literature 1: Japanese Unexamined Patent Application Publication No. 2015-182183

SUMMARY OF INVENTION

Technical Problem

However, since the jig for sliding the seal ring on the tapered outer peripheral surface is long, it is not possible to assemble the seal ring in the groove part of the shaft if a sufficient working space cannot be ensured to use the jig.

An object of the present disclosure is to provide a technique for assembling a ring in a ring groove of a cylindrical member even without a sufficient working space.

Solution to Problem

A first example aspect of the present disclosure provides a ring assembly method for assembling a ring in a ring groove formed on an outer peripheral surface of a cylindrical member. The ring assembly method includes: setting the ring at a small diameter part of a ring temporary holding jig, the ring temporary holding jig including the small diameter part, a tapered part, and a large diameter part in this order, an outer diameter of the small diameter part being smaller than an outer diameter of the large diameter part, an outer peripheral surface of the tapered part being formed to connect an outer peripheral surface of the small diameter part to an outer peripheral surface of the large diameter part, and the outer diameter of the large diameter part being larger than an outer diameter of the cylindrical member; moving the ring to the large diameter part from the small diameter part through the tapered part by using a first ring press member including a cylindrical shape with a leading end part elastically deformable in a radial direction and including a first length in an axial direction, so that the ring temporary holding jig temporarily holds the ring; attaching the ring temporary holding jig for temporarily holding the ring to the cylindrical member; transferring the ring from the large diameter part of the ring temporary holding jig to the outer peripheral surface of the cylindrical member by using a second ring press member, the second ring press member including a cylindrical shape and a second length shorter than the first length in the axial direction; and sliding the ring on the outer peripheral surface of the cylindrical member and then assembling the ring in the ring groove by using the second ring press member. According to the above method, the ring can be assembled in the ring groove of the cylindrical member even without a sufficient working space.

The first ring press member may include a cylindrical part and a plurality of elastic pieces extending from the cylindrical part. According to the above method, the first ring press member can be implemented with a simple configuration.

When the ring is moved relative to the ring temporary holding jig in order to have the ring temporary holding jig to temporarily hold the ring, a ring movement control member including an outer diameter larger than the outer diameter of the large diameter part may be made adjacent to the large diameter part of the ring temporary holding jig. According to the above method, when the ring is moved relative to the ring temporary holding jig in order to have the ring temporary holding jig temporarily hold the ring, the ring does not climb over the large diameter part.

The ring temporary holding jig may include a temporary holding insertion part inserted into an internal space of the cylindrical member when the ring temporary holding jig is attached to the cylindrical member, a temporary holding-side lock hole may be formed in an outer peripheral surface of the temporary holding insertion part, the cylindrical member may include a cylindrical member-side lock hole penetrating therethrough in a radial direction, and when the ring temporary holding jig for temporarily holding the ring is attached to the cylindrical member, the temporary holding insertion part of the ring temporary holding jig may be inserted into the internal space of the cylindrical member, the cylindrical member-side lock hole and the temporary holding-side lock hole may be aligned with each other, and a lock pin may be inserted into the cylindrical member-side lock hole and the temporary holding-side lock hole. According to the above method, the ring temporary holding jig for temporarily holding the ring can be surely attached to the cylindrical member.

The ring temporary holding jig may include a permanent magnet magnetically coupled to the lock pin inserted into the temporary holding-side lock hole. According to the above method, the state in which the lock pin is inserted into the temporary holding-side lock hole can be maintained with a simple configuration, and the lock pin can be easily pulled out from the temporary holding-side lock hole by using a magnet stronger than the permanent magnet.

The second ring press member may include a cylindrical part, a lid part for closing an end part of the cylindrical part, and a bolt, the bolt may include a bolt body with at least a thread part and a head part, a bolt through-hole may be formed in the lid part, the bolt body of the bolt may be inserted into the bolt through-hole, a thread hole corresponding to the bolt through-hole may be formed in the ring temporary holding jig, and when the ring is slid on the outer peripheral surface of the cylindrical member and then assembled in the ring groove, the ring temporary holding jig may be pulled into the second ring press member by fastening the thread part of the bolt to the thread hole of the ring temporary holding jig. According to the above method, the ring can be slid with a strong force on the outer peripheral surface of the cylindrical member.

A second example aspect of the present disclosure provides a method for manufacturing a shaft assembly including: a cylindrical member including a ring groove formed on an outer peripheral surface; and a ring assembled in the ring groove. The method includes: setting the ring at a small diameter part of a ring temporary holding jig, the ring temporary holding jig including the small diameter part, a tapered part, and a large diameter part in this order, an outer diameter of the small diameter part being smaller than an outer diameter of the large diameter part, an outer peripheral surface of the tapered part being formed to connect an outer peripheral surface of the small diameter part to an outer peripheral surface of the large diameter part, and the outer diameter of the large diameter part being larger than an outer diameter of the cylindrical member; moving the ring to the large diameter part from the small diameter part through the tapered part by using a first ring press member including a cylindrical shape with a leading end part elastically deformable in a radial direction and including a first length in an axial direction, so that the ring temporary holding jig temporarily holds the ring; attaching the ring temporary holding jig for temporarily holding the ring to the cylindrical member; transferring the ring from the large diameter part of the ring temporary holding jig to the outer peripheral surface of the cylindrical member by using a second ring press member, the second ring press member including a cylindrical shape and a second length shorter than the first length in the axial direction; and sliding the ring on the outer peripheral surface of the cylindrical member and then assembling the ring in the ring groove by using the second ring press member. According to the above method, the ring can be assembled in the ring groove of the cylindrical member even without the sufficient working space.

The first ring press member may include a cylindrical part and a plurality of elastic pieces extending from the cylindrical part. According to the above method, the first ring press member can be implemented with a simple configuration.

When the ring is moved relative to the ring temporary holding jig in order to have the ring temporary holding jig to temporarily hold the ring, a ring movement control member including an outer diameter larger than the outer diameter of the large diameter part may be made adjacent to the large diameter part of the ring temporary holding jig. According to the above method, when the ring is moved relative to the ring temporary holding jig in order to have the ring temporary holding jig temporarily hold the ring, the ring does not climb over the large diameter part.

The ring temporary holding jig may include a temporary holding insertion part inserted into an internal space of the cylindrical member when the ring temporary holding jig is attached to the cylindrical member, a temporary holding-side lock hole may be formed in an outer peripheral surface of the temporary holding insertion part, the cylindrical member may include a cylindrical member-side lock hole penetrating therethrough in a radial direction, and when the ring temporary holding jig for temporarily holding the ring is attached to the cylindrical member, the temporary holding insertion part of the ring temporary holding jig may be inserted into the internal space of the cylindrical member, the cylindrical member-side lock hole and the temporary holding-side lock hole may be aligned with each other, and a lock pin may be inserted into the cylindrical member-side lock hole and the temporary holding-side lock hole. According to the above method, the ring temporary holding jig for temporarily holding the ring can be surely attached to the cylindrical member.

The ring temporary holding jig may include a permanent magnet magnetically coupled to the lock pin inserted into the temporary holding-side lock hole. According to the above method, the state in which the lock pin is inserted into the temporary holding-side lock hole can be maintained with a simple configuration, and the lock pin can be easily pulled out from the temporary holding-side lock hole by using a magnet stronger than the permanent magnet.

The second ring press member may include a cylindrical part, a lid part for closing an end part of the cylindrical part, and a bolt, the bolt may include a bolt body with at least a thread part and a head part, a bolt through-hole may be formed in the lid part, the bolt body of the bolt may be inserted into the bolt through-hole, a thread hole corresponding to the bolt through-hole may be formed in the ring temporary holding jig, and when the ring is slid on the outer peripheral surface of the cylindrical member and then assembled in the ring groove, the ring temporary holding jig may be pulled into the second ring press member by fastening the thread part of the bolt to the thread hole of the ring temporary holding jig. According to the above method, the ring can be slid with a strong force on the outer peripheral surface of the cylindrical member.

Advantageous Effects of Invention

According to the present disclosure, a ring can be assembled in a ring groove of a cylindrical member even without a sufficient working space.

DESCRIPTION OF EMBODIMENTS

Embodiments of the present disclosure will be described below with reference to the drawings.

Figure 1:
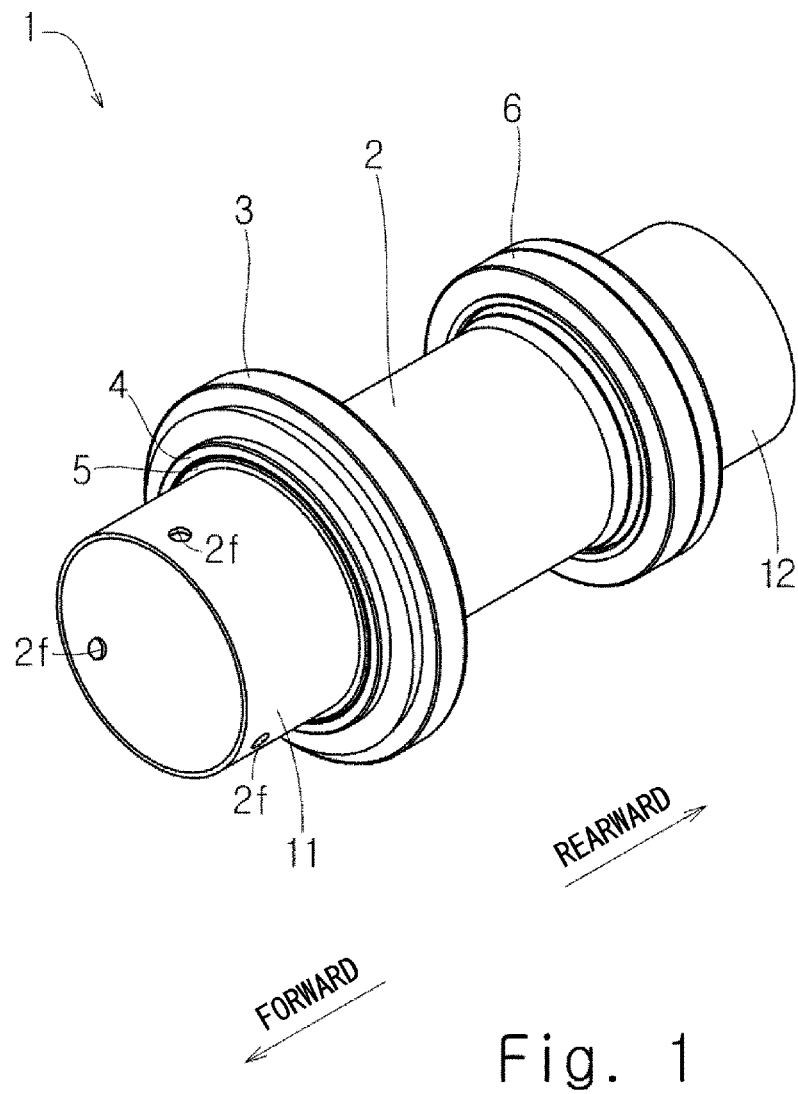
FIG. 1 is a perspective view of a shaft assembly.
Figure 2:
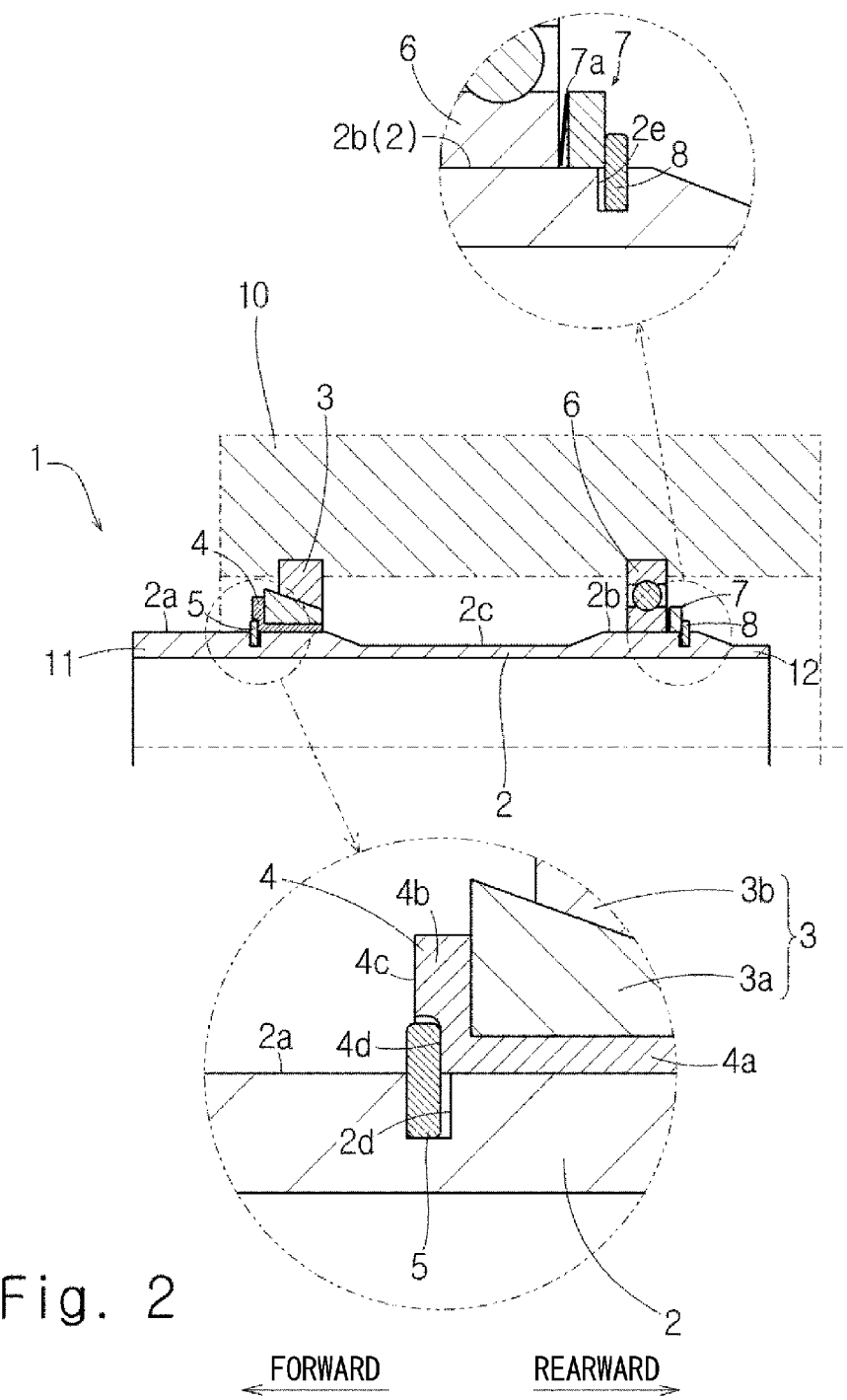
FIG. 2 is a cross-sectional view of the shaft assembly.

FIGS. 1 and 2 show a shaft assembly 1. As shown in FIGS. 1 and 2, the shaft assembly 1 includes a shaft 2 (cylindrical member), a taper roller bearing 3, an inner housing 4, a front end-side retaining ring 5, a ball bearing 6, a preload mechanism 7, and a rear end-side retaining ring 8. In this embodiment, the shaft assembly 1 is composed of at least the shaft 2 and the front end-side retaining ring 5. As shown in FIG. 2, the shaft assembly 1 is housed in a cylindrical frame 10.

The shaft 2 is one specific example of a hollow cylindrical member, typically made of stainless steel. The shaft 2 includes a first peripheral surface 2a where the taper roller bearing 3 is disposed, a second outer peripheral surface 2b where the ball bearing 6 is disposed, and a third peripheral surface 2c disposed between the first peripheral surface 2a and the second outer peripheral surface 2b. In this embodiment, outer diameters of the first outer peripheral surface 2a and the second outer peripheral surface 2b are equal, and an outer diameter of the third outer peripheral surface 2c is smaller than the outer diameters of the first outer peripheral surface 2a and the second outer peripheral surface 2b.

A front end-side ring groove 2d (ring groove) is formed on the first outer peripheral surface 2a of the shaft 2. Similarly, a rear end-side ring groove 2e is formed on the second outer peripheral surface 2b of the shaft 2.

Here, the terms "forward" and "rearward" are defined with reference to FIG. 2. An axial direction of the shaft 2 includes "forward" and "rearward". The term "forward" is defined as a direction in which the front end-side ring groove 2d is viewed from the rear end-side ring groove 2e. The "rearward" is a direction in which the rear end-side ring groove 2e is viewed from the front end-side ring groove 2d. The shaft 2 has a front end part 11 and a rear end part 12.

Returning to FIG. 1, a plurality of shaft-side lock holes 2f (cylindrical member-side lock holes) are formed in the front end part 11 of the shaft 2. Each shaft-side lock hole 2f is a through-hole that penetrates the front end part 11 in a radial direction.

The shaft 2 shown in FIG. 2 is, for example, a part of a propeller that rotates at a high speed, and a rearward axial load is applied thereto. The taper roller bearing 3 is disposed with an orientation suitable for receiving this axial load. The taper roller bearing 3 has an inner race 3a, an outer race 3b, and a plurality of conical rollers (not shown). The outer race 3b is fixed to the frame 10 by press-fitting.

The inner housing 4 is made of, for example, stainless steel, and is positioned radially inward of the taper roller bearing 3. The inner housing 4 includes a cylindrical housing body 4a disposed between the inner race 3a of the taper roller bearing 3 and the first outer peripheral surface 2a of the shaft 2, and an annular flange 4b projecting radially outward from a front end of the housing body 4a. The flange 4b faces the inner race 3a of the taper roller bearing 3 in the axial direction. A ring housing recessed part 4d is formed radially inwardly of a front face 4c of the flange 4b.

Figure 3:
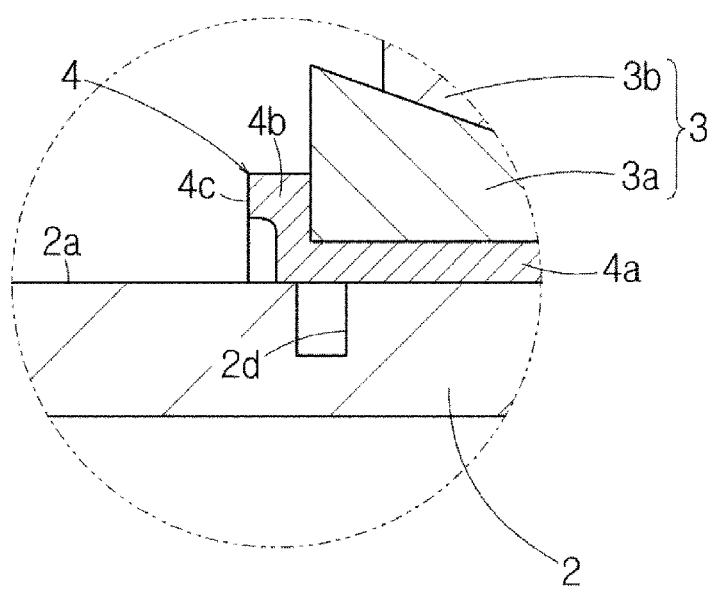
FIG. 3 is a cross-sectional view of the shaft assembly before a front end-side retaining ring is assembled.

FIG. 3 shows a cross-sectional view of the shaft assembly before the front end-side retaining ring 5 is assembled in the front end-side ring groove 2d of the shaft 2.

Figure 4:
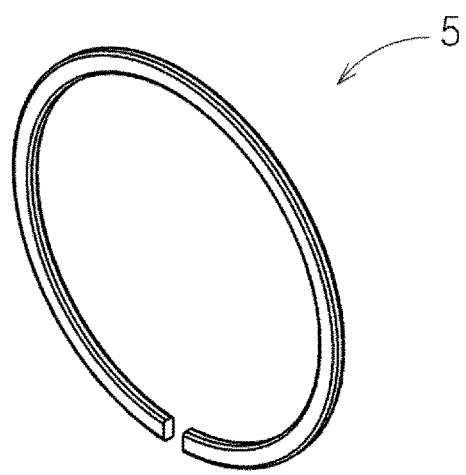
FIG. 4 is a perspective view of the front end-side retaining ring.

FIG. 4 shows a perspective view of the front end-side retaining ring 5. As shown in FIG. 4, the front end-side retaining ring 5 is typically made of stainless steel and is a C-shaped ring. The front end-side retaining ring 5 generally has a rectangular cross section.

Returning to FIG. 2, the ball bearing 6 mainly receives a radial load.

The preload mechanism 7 generates a rearward preload required for the inner race 3a of the taper roller bearing 3 and includes, for example, a disc spring 7a.

The rear end-side retaining ring 8 is made of, for example, stainless steel and is assembled in the rear end-side ring groove 2e of the shaft 2. The rear end-side retaining ring 8 applies the preload generated by the preload mechanism 7 to the shaft 2.

In this configuration, the outer race 3b of the taper roller bearing 3 and the ball bearing 6 are axially fixed to each other with the frame 10 interposed therebetween. The preload generated by the preload mechanism 7 is applied to the inner race 3a through the rear end-side retaining ring 8 and shaft 2, the front end-side retaining ring 5, and the inner housing 4 in this order. As a result, the preload generated by the preload mechanism 7 is applied between the inner race 3a and the outer race 3b of the taper roller bearing 3, and the inner race 3a and the outer race 3b are normally pressed against each other in the axial direction.

As shown in FIG. 3, before the front end-side retaining ring 5 is assembled, the preload generated by the preload mechanism 7 causes the shaft 2 to move rearward with respect to the taper roller bearing 3, and as a result, the front end-side ring groove 2d of the shaft 2 is positioned radially inward of the housing body 4a of the inner housing 4.

Next, a ring assembly method for assembling the front end-side retaining ring 5 in the front end-side ring groove 2d formed on the first outer peripheral surface 2a of the shaft 2 is described with reference to FIG. 5 and subsequent drawings. In other words, the method of manufacturing the shaft assembly 1 is described with reference to FIG. 5 and subsequent drawings.

However, prior to the explanation of the ring assembly method and the method for manufacturing the shaft assembly 1, it is assumed, for example, that all the components except the front end-side retaining ring 5 have already been assembled as shown in FIG. 3.

Figure 5:
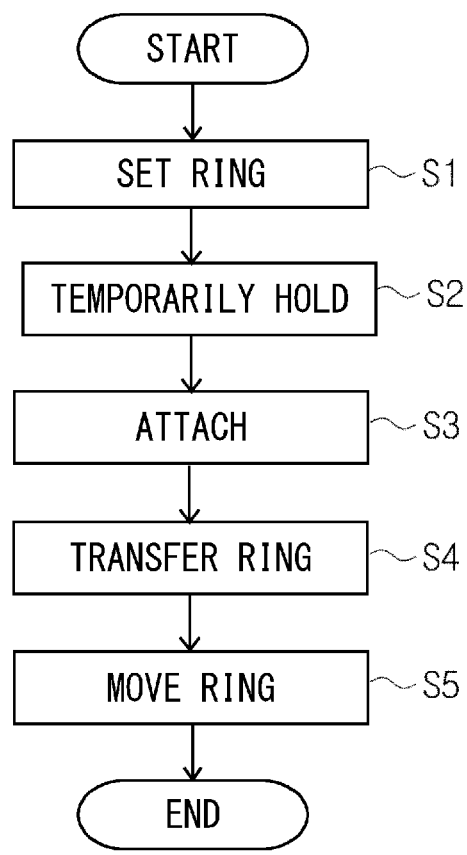
FIG. 5 is a flow of a ring assembly method.

As shown in FIG. 5, the ring assembly method and the method for manufacturing the shaft assembly 1 include a ring setting process (S1), a temporary holding process (S2), an attaching process (S3), a ring transferring process (S4), and a ring moving process (S5) in the order described.

Ring Setting Process: S1

Figure 6:
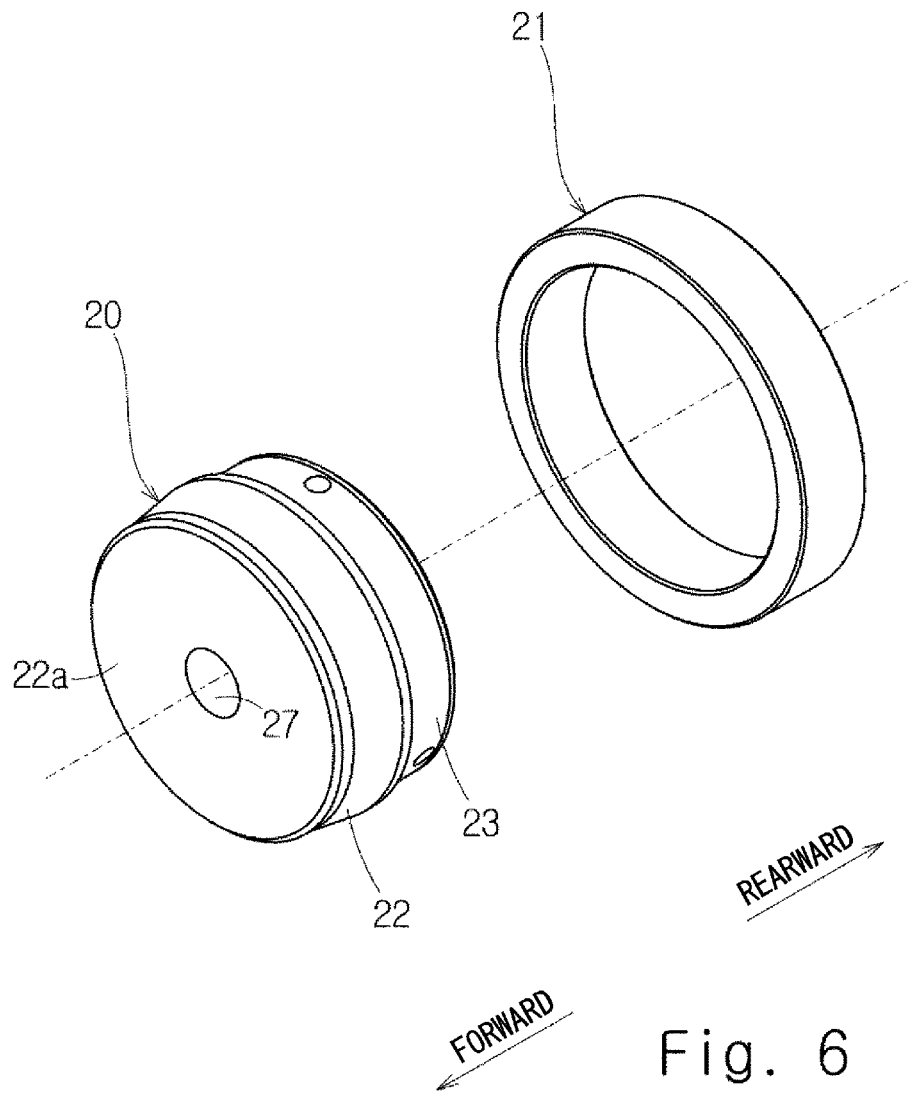
FIG. 6 is a perspective view of a ring temporary holding jig and a ring movement control member.
Figure 7:
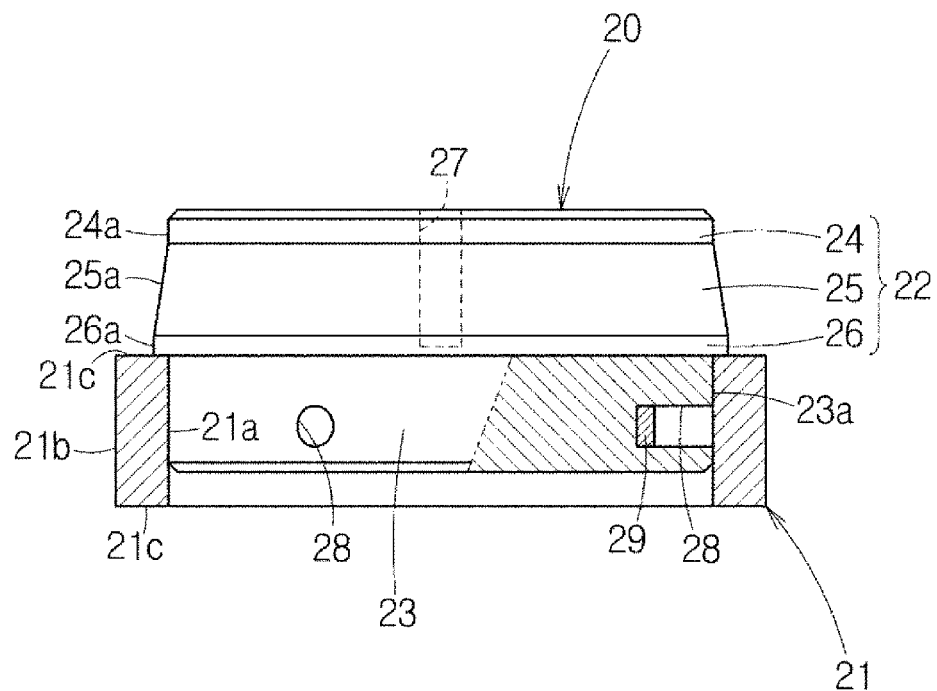
FIG. 7 is a cross-sectional view of the ring temporary holding jig mounted on the ring movement control member.
Figure 8:
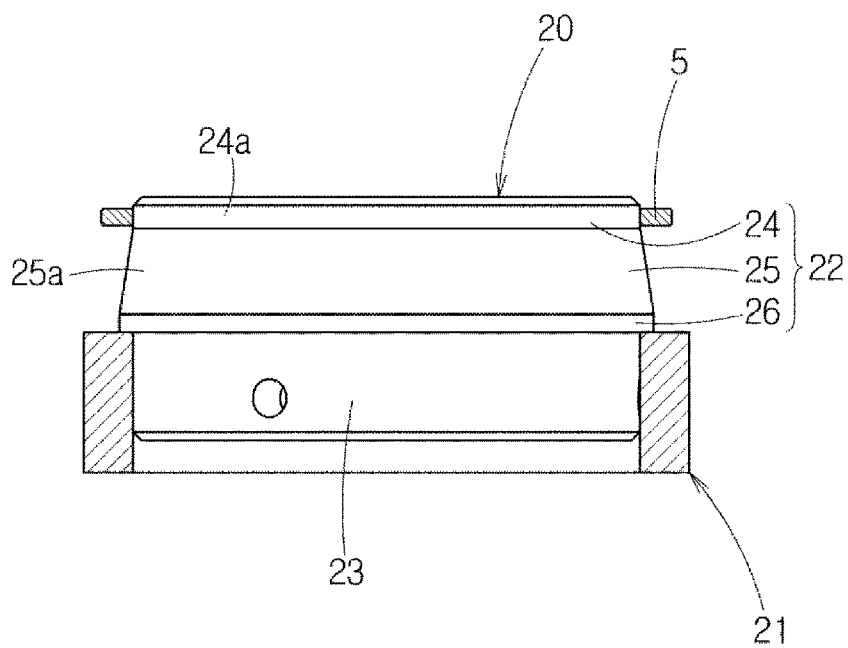
FIG. 8 is a cross-sectional view showing the front end-side retaining ring set at a small diameter part of the ring temporary holding jig.

FIGS. 6 and 7 show a ring temporary holding jig 20 used in the ring setting process and a ring movement control member 21 used in the temporary holding process. FIG. 8 shows a state in which the ring temporary holding jig 20 is mounted on a ring movement control member 21.

As shown in FIGS. 6 and 7, the ring temporary holding jig 20 is made of, for example, stainless steel and includes a holder body 22 and a temporary holding insertion part 23.

As shown in FIG. 7, the holder body 22 includes a small diameter part 24, a tapered part 25, and a large diameter part 26 in the order described. An outer peripheral surface 24a of the small diameter part 24 extends parallel to the axial direction. An outer peripheral surface 25a of the tapered part 25 is inclined with respect to the axial direction. The outer peripheral surface 25a of the tapered part 25 is inclined in such a way that a diameter thereof is expanded toward an outer peripheral surface 26a of the large diameter part 26. The outer peripheral surface 26a of the large diameter part 26 extends parallel to the axial direction. An outer diameter of the small diameter part 24 is smaller than an outer diameter of the large diameter part 26. The outer diameter of the small diameter part 24 is smaller than an inner diameter of the front end-side retaining ring 5 when no load is applied thereto. The outer diameter of the large diameter part 26 is equal to the outer diameter of the first outer peripheral surface 2a of the shaft 2 shown in FIG. 2 or slightly larger than the outer diameter of the first outer peripheral surface 2a of the shaft 2. Returning to FIG. 7, the outer peripheral surface 25a of the tapered part 25 is inclined with respect to the axial direction so as to connect the outer peripheral surface 24a of the small diameter part 24 to the outer peripheral surface 26a of the large diameter part 26. Returning to FIG. 6, a thread hole 27 is formed in the front face 22a of the holder body 22.

The temporary holding insertion part 23 is configured to be insertable into an internal space of the shaft 2 shown in FIG. 2. An outer diameter of the temporary holding insertion part 23 is smaller than the outer diameter of the large diameter part 26. A plurality of temporary holding-side lock holes 28 are formed in the outer peripheral surface 23a of the temporary holding insertion part 23. Each temporary holding-side lock hole 28 extends in the radial direction. Each temporary holding-side lock hole 28 houses a permanent magnet 29.

The ring movement control member 21 is, for example, a stainless steel ring with a rectangular cross section, and is configured in such a way that the temporary holding insertion part 23 of the ring temporary holding jig 20 can be inserted into the ring movement control member 21. The ring movement control member 21 includes an inner peripheral surface 21a and an outer peripheral surface 21b, and two end surfaces 21c. An inner diameter of the inner peripheral surface 21a is substantially equal to the outer diameter of the temporary holding insertion part 23 of the ring temporary holding jig 20. An outer diameter of the outer peripheral surface 21b is larger than the outer diameter of the large diameter part 26 of the holder body 22 of the ring temporary holding jig 20. Therefore, when the temporary holding insertion part 23 of the ring temporary holding jig 20 is inserted into the ring movement control member 21, the large diameter part 26 of the holder body 22 of the ring temporary holding jig 20 sits on one end surface 21c of the ring movement control member 21. As a result, the large diameter part 26 of the holder body 22 of the ring temporary holding jig 20 is axially adjacent to the ring movement control member 21. In a state in which the large diameter part 26 sits on the end surface 21c, the end surface 21c on which the large diameter part 26 sits is exposed radially outward of the large diameter part 26.

In this state, as shown in FIG. 8, the front end-side retaining ring 5 is set radially outward of the small diameter part 24 of the holder body 22 of the ring temporary holding jig 20. At this time, the front end-side retaining ring 5 falls and sits on the outer peripheral surface 25a of the tapered part 25 or is inclined, so that the front end-side retaining ring 5 is caught by the outer peripheral surface 24a of the small diameter part 24 and then stays.

Temporary Holding Process: S2

Next, the front end-side retaining ring 5 is moved from the small diameter part 24 to the large diameter part 26 through the tapered part 25 so that the ring temporary holding jig 20 temporarily holds the front end-side retaining ring 5. In this temporary holding process, the first ring press member 30 shown in FIG. 9 is used.

Figure 9:
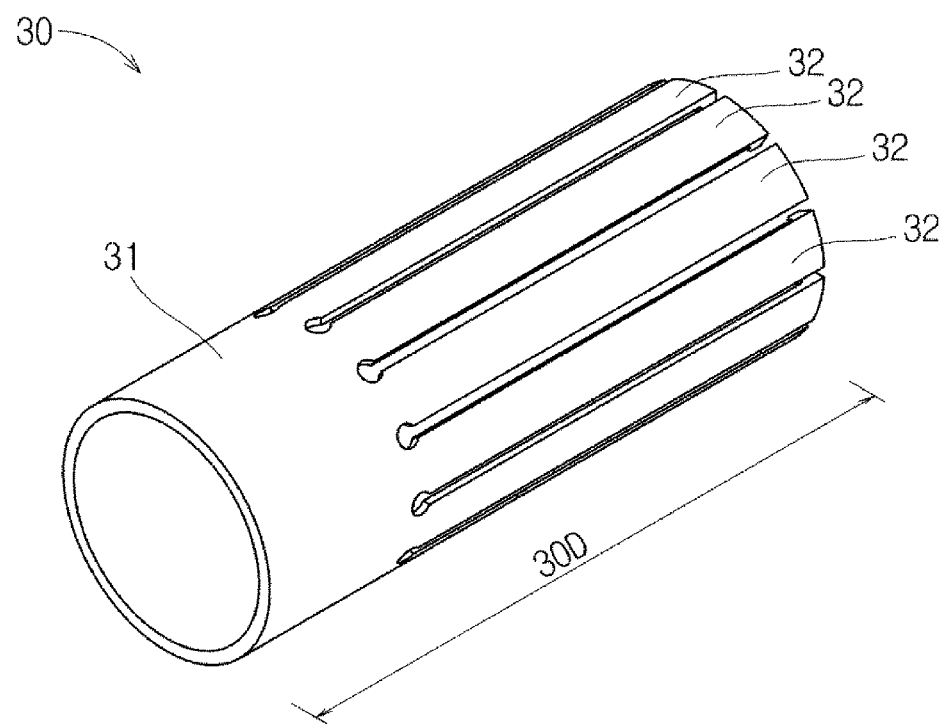
FIG. 9 is a perspective view of a first ring press member.

As shown in FIG. 9, the first ring press member 30 is made of, for example, resin and includes a cylindrical part 31 and a plurality of elastic pieces 32 extending from the cylindrical part 31 in the axial direction of the cylindrical part 31. Each elastic piece 32 is a cantilever that is elastic and deformable in the radial direction. The first ring press member 30 has a dimension 30D in the axial direction of the first ring press member 30.

Figure 10:
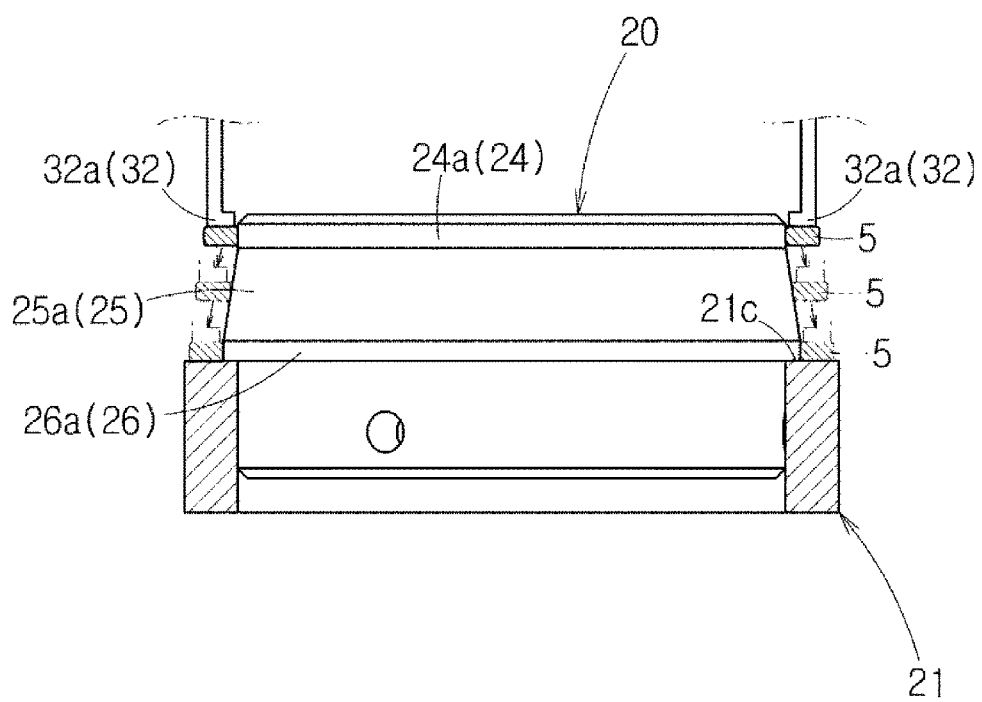
FIG. 10 is a cross-sectional view showing temporary holding of a front end-side retaining ring by the ring temporary holding jig.
Figure 11:
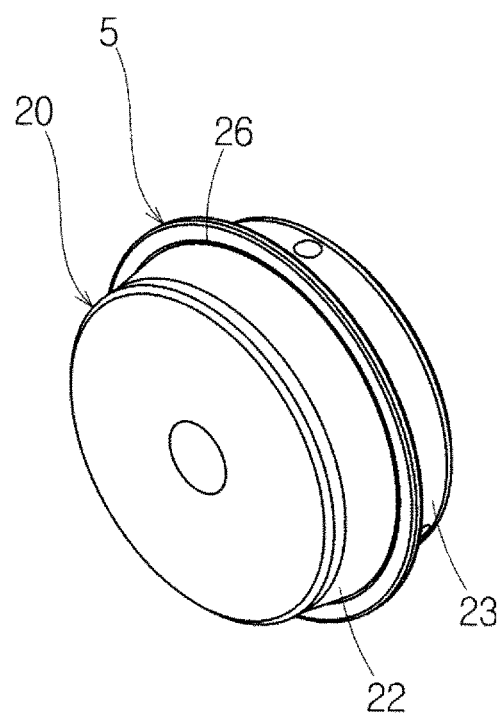
FIG. 11 is a perspective view of the ring temporary holding jig temporarily holding the front end-side retaining ring.

Then, as shown in FIG. 10, a leading end part 32a of each elastic piece 32 is pushed against the front end-side retaining ring 5, and the front end-side retaining ring 5 is pushed toward the ring movement control member 21. Then, the front end-side retaining ring 5 slides down the outer peripheral surface 25a of the tapered part 25 while the front end-side retaining ring 5 is deformed and the diameter thereof is expanded, and eventually reaches the outer peripheral surface 26a of the large diameter part 26 and also reaches the end surface 21c of the ring movement control member 21. The front end-side retaining ring 5 is pressed against the outer peripheral surface 26a of the large diameter part 26 by a spring elastic restoring force, so that, as shown in FIG. 11, the front end-side retaining ring 5 is temporarily held by the large diameter part 26 of the holder body 22 of the ring temporary holding jig 20. Since the ring movement control member 21 is no longer used after the above temporary holding is completed, the ring movement control member 21 is removed from the ring temporary holding jig 20 and recovered.

Attaching Process: S3

Figure 12:
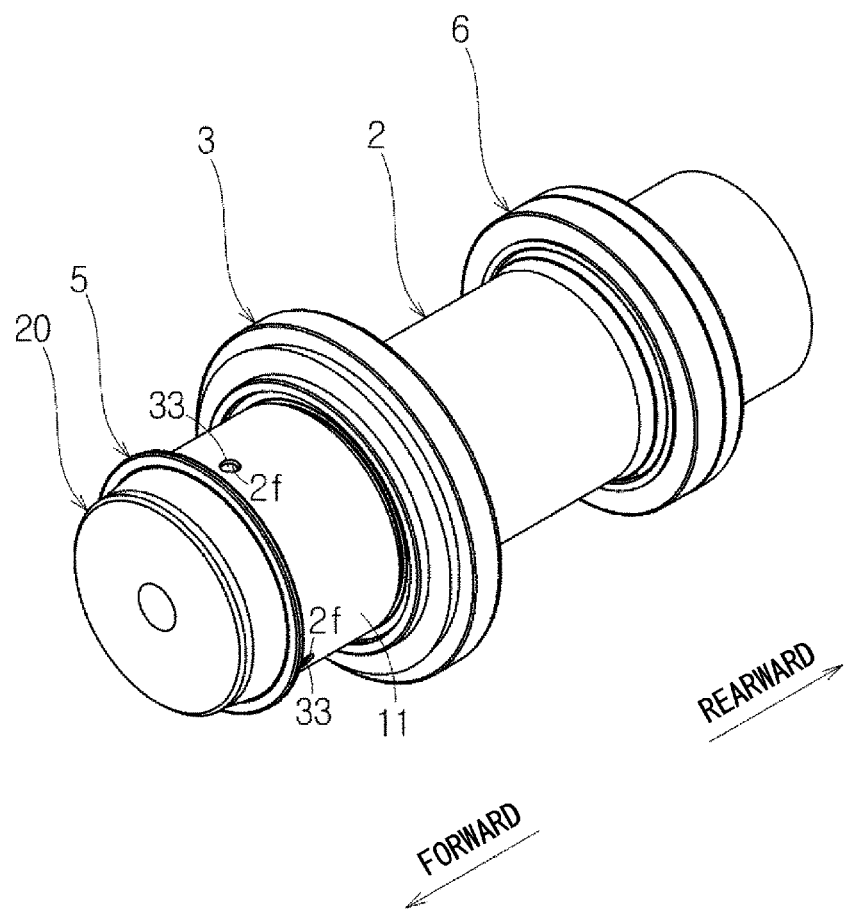
FIG. 12 is a perspective view showing the ring temporary holding jig temporarily holding the front end-side retaining ring attached to a shaft.
Figure 13:
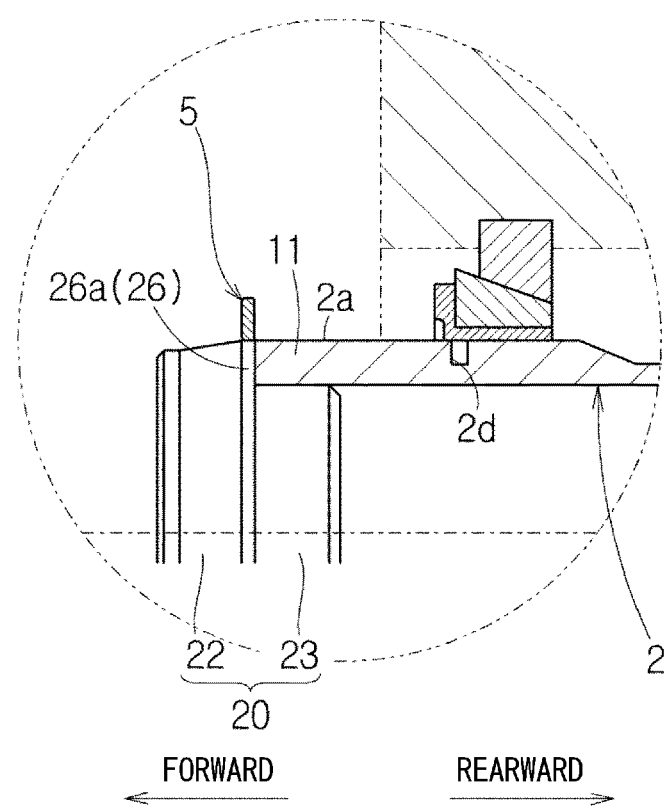
FIG. 13 is a cross-sectional view showing the ring temporary holding jig temporarily holding the front end-side retaining ring attached to the shaft.

Next, as shown in FIGS. 12 and 13, the ring temporary holding jig 20 for temporarily holding the front end-side retaining ring 5 is attached to the front end part 11 of the shaft 2. Specifically, as shown in FIG. 13, the temporary holding insertion part 23 of the ring temporary holding jig 20 is inserted into an internal space of the front end part 11 of the shaft 2, and the large diameter part 26 of the holder body 22 of the ring temporary holding jig 20 is axially abut against the front end part 11 of the shaft 2. In this embodiment, the outer diameter of the outer peripheral surface 26a of the large diameter part 26 is set to be equal to the outer diameter of the front end part 11 of the shaft 2. Therefore, by the above abutment, the outer peripheral surface 26a of the large diameter part 26 and the first outer peripheral surface 2a of the shaft 2 become the same plane, so that the front end-side retaining ring 5 can move from the outer peripheral surface 26a of the large diameter part 26 to the first outer peripheral surface 2a of the shaft 2.

At this time, the plurality of temporary holding-side lock holes 28 formed in the outer peripheral surface 23a of the temporary holding insertion part 23 of the ring temporary holding jig 20 shown in FIG. 7 are aligned with the plurality of shaft-side lock holes 2f formed in the front end part 11 of the shaft 2 shown in FIG. 1, respectively, and lock pins 33 are inserted into the respective shaft-side lock holes 2f and corresponding temporary holding-side lock holes 28 as shown in FIG. 12. Each inserted lock pin 33 is magnetically coupled to the permanent magnet 29 shown in FIG. 7, so that each lock pin 33 does not fall out of the corresponding shaft-side lock hole 2f. When the lock pin 33 is simultaneously accommodated in each shaft-side lock hole 2f and the corresponding temporary holding-side lock hole 28, removal of the ring temporary holding jig 20 from the shaft 2 is prohibited.

Ring Transferring Process: S4

Next, in FIG. 13, the front end-side retaining ring 5 temporarily held by the ring temporary holding jig 20 is transferred to the first outer peripheral surface 2a of the shaft 2. In this transfer, a second ring press member 40 shown in FIGS. 14 and 15 is used.

Figure 14:
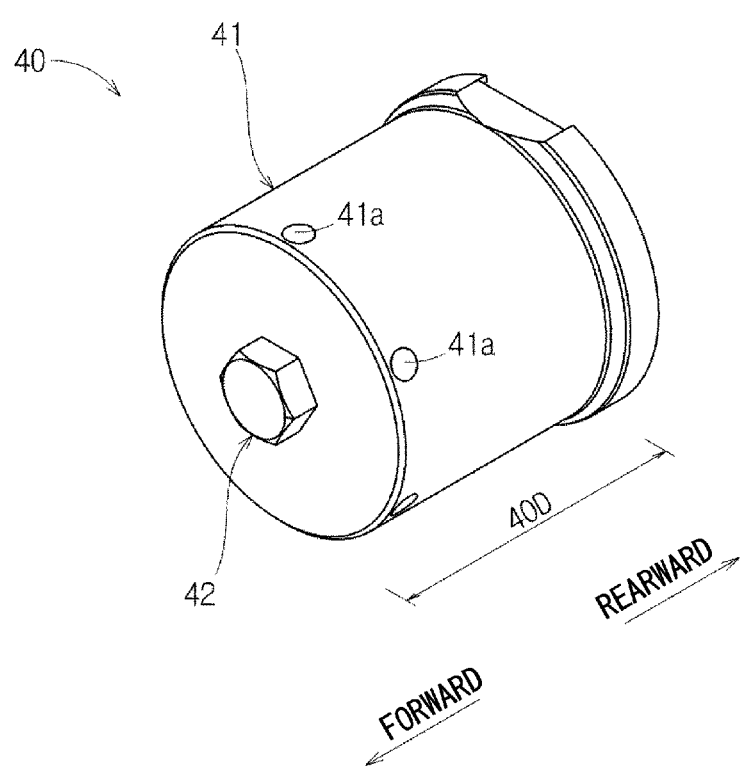
FIG. 14 is a perspective view of a second ring press member.

As shown in FIG. 14, the second ring press member 40 has a dimension 40D in the axial direction. The dimension 40D of the second ring press member 40 is smaller than the dimension 30D of the first ring press member 30 shown in FIG. 9. That is, the second ring press member 40 is shorter than the first ring press member 30. Returning to FIG. 14, the second ring press member 40 includes a press member body 41 and a bolt 42.

Figure 15:
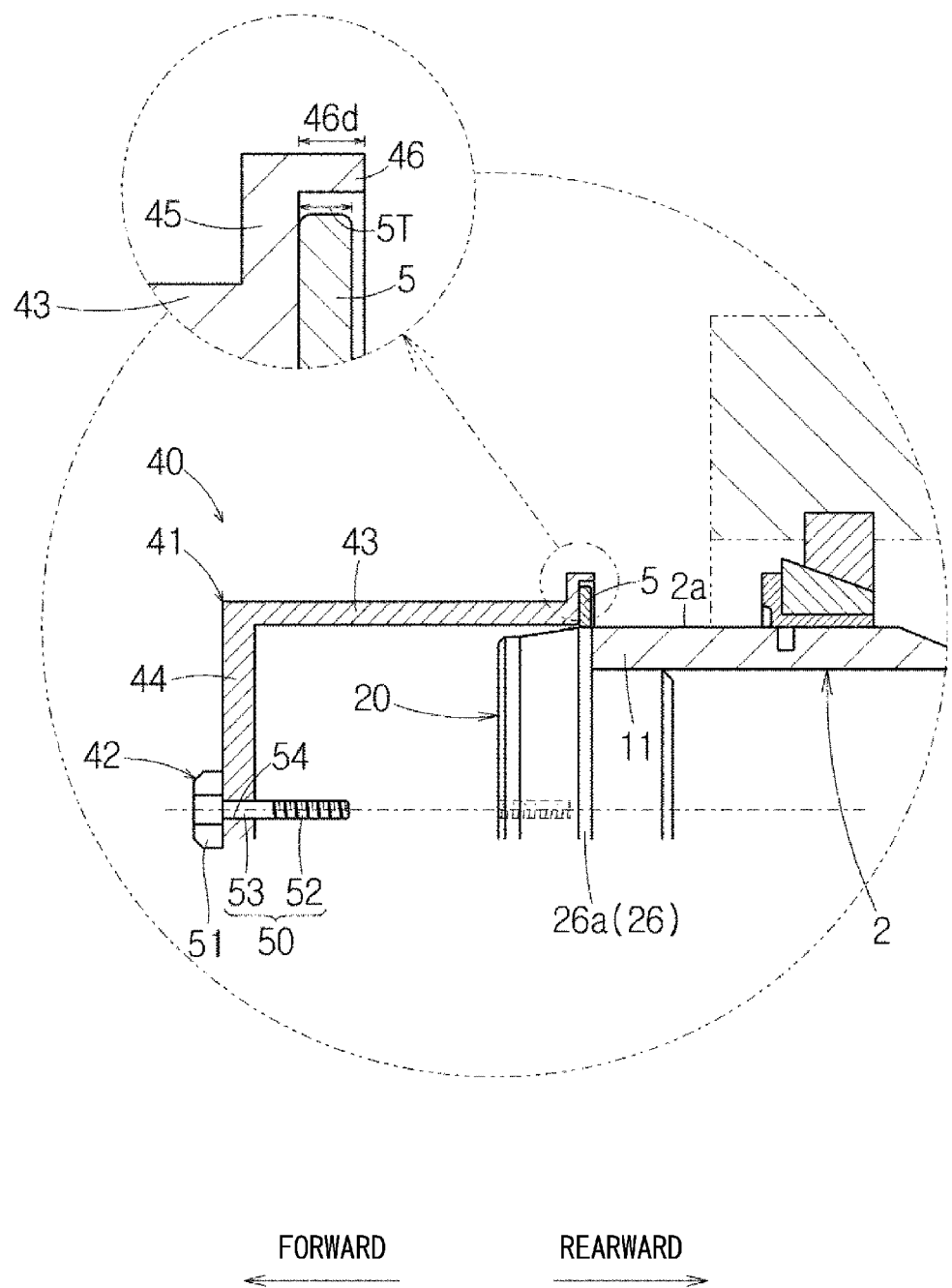
FIG. 15 is a cross-sectional view of the second ring press member being pushed against the front end-side retaining ring temporarily held by the ring temporary holding jig.

As shown in FIG. 15, the press member body 41 is made of, for example, stainless steel and includes a cylindrical body 43 and a lid part 44 that closes a forward end part of the cylindrical body 43.

An inner diameter of the cylindrical body 43 is set slightly larger than the outer diameter of the front end part 11 of the shaft 2. The inner diameter of the cylindrical body 43 is set slightly larger than the outer diameter of the large diameter part 26 of the ring temporary holding jig 20. An annular flange 45 projecting radially outward and a housing press part 46 projecting radially outward from a radially outward end part of the flange 45 are formed at an end part on the rear side of the cylindrical body 43. An inner diameter of the housing press part 46 is set larger than an outer diameter of the front end-side retaining ring 5. Therefore, the front end-side retaining ring 5 can be accommodated radially inward of the housing press part 46. A dimension 46d of the housing press part 46 in the axial direction is set larger than a dimension 5T of the front end-side retaining ring 5 in the axial direction.

The bolt 42 includes a bolt body 50 and a head part 51. The bolt body 50 includes a thread part 52 and a torso part 53.

A bolt through-hole 54 is formed in the center of the lid part 44, through which the bolt body 50 of the bolt 42 can be inserted.

Next, as shown in FIG. 15, the flange 45 of the second ring press member 40 faces the front end-side retaining ring 5 in the axial direction. In this state, by pushing the second ring press member 40 rearward, the front end-side retaining ring 5 is transferred from the outer peripheral surface 26a of the large diameter part 26 of the ring temporary holding jig 20 to the first outer peripheral surface 2a of the shaft 2.

Note that as shown in FIG. 14, a plurality of holes 41a into which detent bars (not shown) can be inserted are formed in an outer peripheral surface of the press member body 41.

Ring Moving Process: S5

Figure 16:
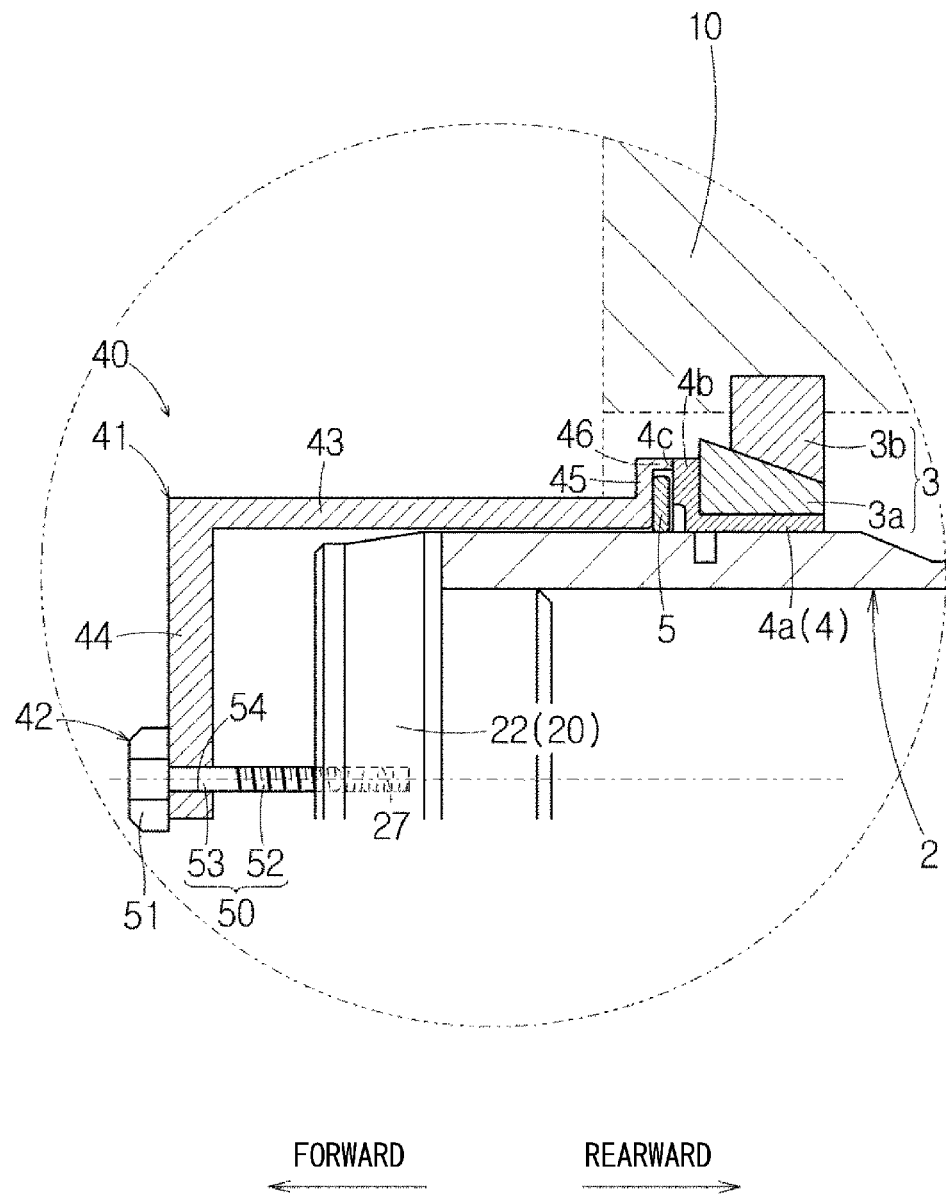
FIG. 16 is a cross-sectional view showing a rearward movement of the front end-side retaining ring by using the second ring press member.

Returning to FIG. 15, when the second ring press member 40 is continuously pushed rearward, the front end-side retaining ring 5 slides rearward on the first outer peripheral surface 2a of the shaft 2. Then, as shown in FIG. 16, the housing press part 46 of the second ring press member 40 abuts against the front face 4c of the flange 4b of the inner housing 4. At this time, since the taper roller bearing 3 is axially fixed to the frame 10, the second ring press member 40 can no longer be pushed rearward.

In this state, the bolt 42 is rotated and the thread part 52 of the bolt 42 is fastened to the thread hole 27 of the holder body 22 of the ring temporary holding jig 20. At this time, since the head part 51 of the bolt 42 is formed larger than the bolt through-hole 54, a rearward movement is prohibited. Therefore, as the above fastening proceeds, the shaft 2 is pulled forward through the ring temporary holding jig 20 and further pulled into the internal space of the press member body 41 of the second ring press member 40 as shown in FIG. 17.

When the bolt 42 is rotated, a detent bar may be inserted into one of the plurality of holes 41a shown in FIG. 14. By doing so, co-rotation of the press member body 41 can be easily prevented.

Figure 17:
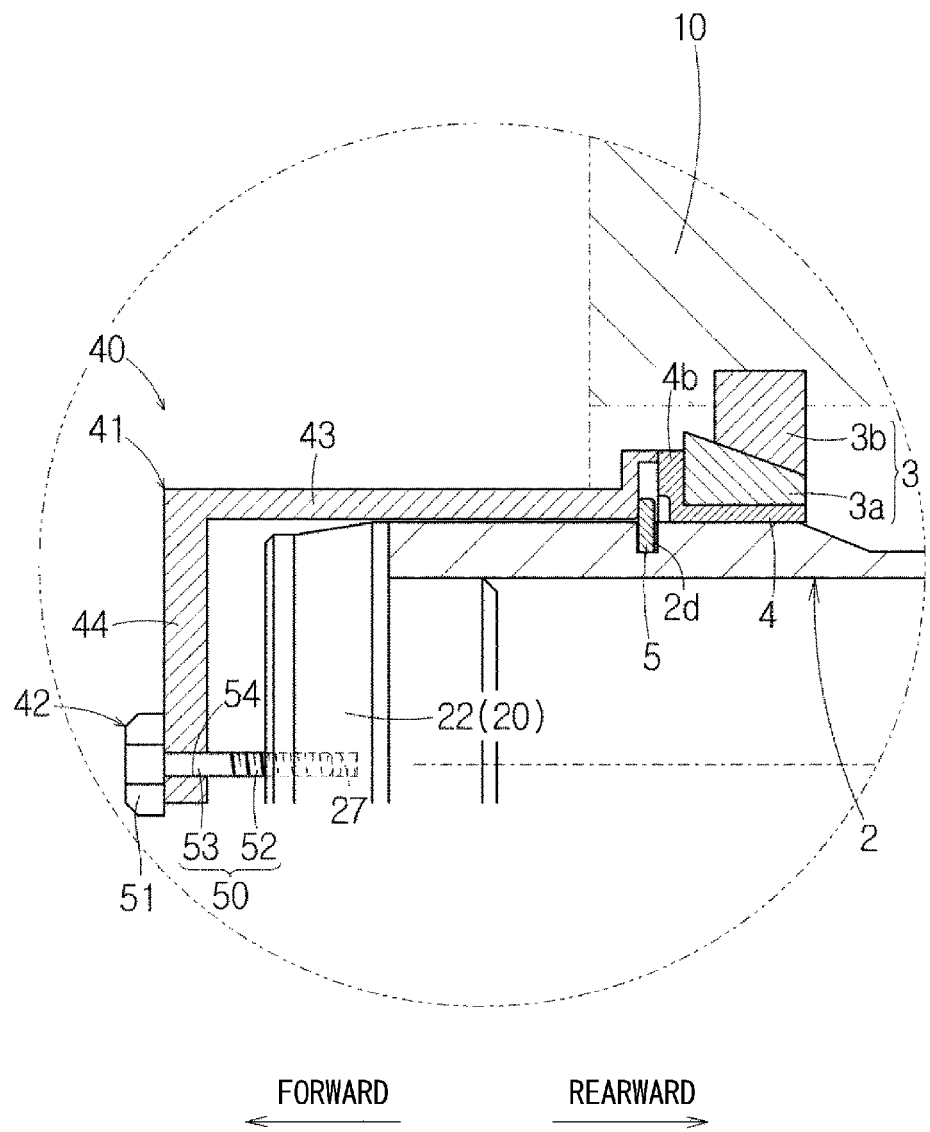
FIG. 17 is a cross-sectional view of the front end-side retaining ring assembled in the ring groove by using the second ring press member.

Then, as shown in FIG. 17, when the front end-side ring groove 2d of the shaft 2 moves forward relative to the second ring press member 40, it reaches the radially inward of the front end-side retaining ring 5, and then the front end-side retaining ring 5 is assembled in the front end-side ring groove 2d while the front end-side retaining ring 5 is deformed and the diameter thereof is reduced by the spring elastic restoring force.

When the above assembly is completed, the bolt 42 is pulled out from the thread hole 27 of the ring temporary holding jig 20 to recover the second ring press member 40 from the shaft 2. Then, the shaft 2 is moved rearward relative to the taper roller bearing 3 due to the preload generated by the preload mechanism 7, resulting in the state shown in FIG. 2.

The plurality of lock pins 33 shown in FIG. 12 are pulled out from the corresponding shaft-side lock holes 2f to recover the ring temporary holding jig 20 from the shaft 2. In order to pull out the plurality of lock pins 33 from the corresponding shaft-side lock holes 2f, magnets stronger than the permanent magnets 29 magnetically coupled to the respective lock pins 33 (see FIG. 7) may be magnetically coupled to the lock pins 33. Thus, by pulling the magnets radially outward, the lock pins 33 can be easily pulled out from the shaft-side lock holes 2f.

Although the preferred embodiment of the present disclosure has been described above, the above embodiment has the following features.

For example, as shown in FIG. 2, the ring assembly method for assembling the front end-side retaining ring 5 (ring) in the front end-side ring groove 2d (ring groove) formed on the first outer peripheral surface 2a (outer peripheral surface) of the shaft 2 (cylindrical member) includes the following processes.

As shown in FIG. 8, a process of setting the front end-side retaining ring 5 at the small diameter part 24 of the ring temporary holding jig 20, the ring temporary holding jig 20 including the small diameter part 24, the tapered part 25, and the large diameter part 26 in this order, the outer diameter of the small diameter part 24 being smaller than the outer diameter of the large diameter part 26, the outer peripheral surface 25a of the tapered part 25 being formed to connect the outer peripheral surface 24a of the small diameter part 24 to the outer peripheral surface 26a of the large diameter part 26, and the outer diameter of the large diameter part 26 being larger than the outer diameter of the shaft 2 (S1).

As shown in FIGS. 9 and 10, a process of moving the front end-side retaining ring 5 to the large diameter part 26 from the small diameter part 24 through the tapered part 25 by using the first ring press member 30 including the cylindrical shape with the leading end part 32a elastically deformable in the radial direction and including the dimension 30D (first length) in the axial direction, so that the ring temporary holding jig 20 temporarily holds the front end-side retaining ring 5 (S2).

As shown in FIGS. 12 and 13, a process of attaching the ring temporary holding jig 20 for temporarily holding the front end-side retaining ring 5 to the shaft 2 (S3).

As shown in FIGS. 14 and 15, a process of transferring the front end-side retaining ring 5 from the large diameter part 26 of the ring temporary holding jig 20 to the first outer peripheral surface 2a of the shaft 2 by using the second ring press member 40 including the cylindrical shape and the length 40D (second length) that is shorter than the dimension 30D in the axial direction (S4).

As shown in FIGS. 16 and 17, a process of sliding the front end-side retaining ring 5 on the first outer peripheral surface 2a of the shaft 2 to assemble the front end-side retaining ring 5 in the ring groove 2d by using the second ring press member 40 (S5).

According to the above method, the front end-side retaining ring 5 can be assembled in the front end-side ring groove 2d of the shaft 2 even without a sufficient working space.

Also, as shown in FIG. 9, the first ring press member 30 has the cylindrical part 31 and the plurality of elastic pieces 32 extending from the cylindrical part 31. According to the above method, the first ring press member 30 can be implemented with a simple configuration.

In addition, as shown in FIG. 10, when the front end-side retaining ring 5 is moved relative to the ring temporary holding jig 20 in order to have the ring temporary holding jig 20 temporarily hold the front end-side retaining ring 5, the ring movement control member 21 having the outer diameter larger than the outer diameter of the large diameter part 26 is made adjacent to the large diameter part 26 of the ring temporary holding jig 20. According to the above method, when the front end-side retaining ring 5 is moved relative to the ring temporary holding jig 20 in order to have the ring temporary holding jig 20 temporarily hold the front end-side retaining ring 5, the front end-side retaining ring 5 does not climb over the large diameter part 26.

Also, as shown in FIG. 13, the ring temporary holding jig 20 includes the temporary holding insertion part 23 that is inserted into the internal space of the shaft 2 when the ring temporary holding jig 20 is attached to the shaft 2. As shown in FIG. 7, the plurality of temporary holding-side lock holes 28 are formed in the outer peripheral surface 23a of the temporary holding insertion part 23. As shown in FIG. 1, the shaft 2 has the shaft-side lock holes 2f (cylindrical member-side lock holes) that penetrate in the radial direction. As shown in FIGS. 12 and 13, when the ring temporary holding jig 20 for temporarily holding the front end-side retaining ring 5 is attached to the shaft 2, the temporary holding insertion part 23 of the ring temporary holding jig 20 is inserted into the internal space of the shaft 2, the plurality of shaft-side lock holes 2f are aligned with the plurality of temporary holding-side lock holes 28, and the plurality of lock pins 33 are inserted into the plurality of shaft-side lock holes 2f and the plurality of temporary holding-side lock holes 28, respectively. According to the above method, the ring temporary holding jig 20 for temporarily holding the front end-side retaining ring 5 can be surely attached to the shaft 2.

As shown in FIG. 7, one temporary holding-side lock hole 28 may be formed in the outer peripheral surface 23a of the temporary holding insertion part 23 in place of the plurality of temporary holding-side lock holes 28 formed in the outer peripheral surface 23a of the temporary holding insertion part 23. The same applies to the shaft-side lock holes 2f.

Also, as shown in FIG. 7, the ring temporary holding jig 20 has the permanent magnets 29 magnetically coupled to the lock pins 33 inserted into the respective temporary holding-side lock holes 28. According to the above method, the state in which the lock pins 33 are inserted into the temporary holding-side lock holes 28 can be maintained with a simple configuration, and the lock pins 33 can be easily pulled out from the temporary holding-side lock holes 28 by using magnets stronger than the permanent magnets 29.

Moreover, as shown in FIGS. 14 and 15, the second ring press member 40 includes the cylindrical body 43 (cylindrical part), the lid part 44 that closes the end part of the cylindrical body 43, and the bolt 42. The bolt 42 includes the bolt body 50 with at least the thread part 52 and the head part 51. The bolt through-hole 54 is formed in the lid part 44. The bolt body 50 of the bolt 42 is inserted into the bolt through-hole 54. As shown in FIG. 16, the thread hole 27 corresponding to the bolt through-hole 54 is formed in the ring temporary holding jig 20. When the front end-side retaining ring 5 is slid on the first outer peripheral surface 2a of the shaft 2 and assembled in the front end-side ring groove 2d, the ring temporary holding jig 20 is pulled into the second ring press member 40 by fastening the thread part 52 of the bolt 42 to the thread hole 27 of the ring temporary holding jig 20. According to the above method, the front end-side retaining ring 5 can be slid with a strong force on the first outer peripheral surface 2a of the shaft 2.

This application claims priority on the basis of Japanese Patent Application No. 2020-139784, filed Aug. 21, 2020, the entire disclosure of which is incorporated herein by reference.

REFERENCE SIGNS LIST

1 SHAFT ASSEMBLY
2 SHAFT
2a FIRST OUTER PERIPHERAL SURFACE
2b SECOND OUTER PERIPHERAL SURFACE
2c THIRD OUTER PERIPHERAL SURFACE
2d FRONT END-SIDE RING GROOVE
2e REAR END-SIDE RING GROOVE
2f SHAFT-SIDE LOCK HOLE
3 TAPER ROLLER BEARING
3a INNER RACE
3b OUTER RACE
4 INNER HOUSING
4a HOUSING BODY
4b FLANGE
4c FRONT FACE
4d RING HOUSING RECESSED PART
5 FRONT END-SIDE RETAINING RING
5T DIMENSION
6 BALL BEARING
7 PRELOAD MECHANISM
7a DISH SPRING
8 REAR END-SIDE RETAINING RING
10 FRAME
11 FRONT END PART
12 REAR END PART
20 RING TEMPORARY HOLDING JIG
21 RING MOVEMENT CONTROL MEMBER
21a INNER PERIPHERAL SURFACE
21b OUTER PERIPHERAL SURFACE
21c END SURFACE

22 HOLDER BODY
22a FRONT FACE
23 TEMPORARY HOLDING INSERTION PART
23a OUTER PERIPHERAL SURFACE
24 SMALL DIAMETER PART
24a OUTER PERIPHERAL SURFACE
25 TAPERED PART
25a OUTER PERIPHERAL SURFACE
26 LARGE DIAMETER PART
26a OUTER PERIPHERAL SURFACE
27 THREAD HOLE
28 TEMPORARY HOLDING-SIDE LOCK HOLE
29 PERMANENT MAGNET
30 FIRST RING PRESS MEMBER
30D DIMENSION
31 CYLINDRICAL PART
32 ELASTIC PIECE
32a LEADING END PART
33 LOCK PIN
40 SECOND RING PRESS MEMBER
40D DIMENSION
41 PRESS MEMBER BODY
41a HOLE
42 BOLT
43 CYLINDRICAL BODY
44 LID PART
45 FLANGE
46 HOUSING PRESS PART
46d DIMENSION
50 BOLT BODY
51 HEAD PART
52 THREAD PART
53 TORSO PART
54 BOLT THROUGH-HOLE

The invention claimed is:

1. A ring assembly method for assembling a ring in a ring groove formed on an outer peripheral surface of a cylindrical member, the ring assembly method comprising:
setting the ring at a small diameter part of a ring temporary holding jig, the ring temporary holding jig including the small diameter part, a tapered part, and a large diameter part in this order, an outer diameter of the small diameter part being smaller than an outer diameter of the large diameter part, an outer peripheral surface of the tapered part being formed to connect an outer peripheral surface of the small diameter part to an outer peripheral surface of the large diameter part, and the outer diameter of the large diameter part being larger than an outer diameter of the cylindrical member;
moving the ring to the large diameter part from the small diameter part through the tapered part by using a first ring press member including a cylindrical shape with a leading end part elastically deformable in a radial direction and including a first length in an axial direction, so that the ring temporary holding jig temporarily holds the ring;
attaching the ring temporary holding jig for temporarily holding the ring to the cylindrical member;
transferring the ring from the large diameter part of the ring temporary holding jig to the outer peripheral surface of the cylindrical member by using a second ring press member, the second ring press member including a cylindrical shape and a second length shorter than the first length in the axial direction; and
sliding the ring on the outer peripheral surface of the cylindrical member and then assembling the ring in the ring groove by using the second ring press member.

2. The ring assembly method according to claim 1, wherein
the first ring press member includes a cylindrical part and a plurality of elastic pieces extending from the cylindrical part.

3. The ring assembly method according to claim 1, wherein
when the ring is moved relative to the ring temporary holding jig in order to have the ring temporary holding jig to temporarily hold the ring, a ring movement control member including an outer diameter larger than the outer diameter of the large diameter part is made adjacent to the large diameter part of the ring temporary holding jig.

4. The ring assembly method according to claim 1, wherein
the ring temporary holding jig includes a temporary holding insertion part inserted into an internal space of the cylindrical member when the ring temporary holding jig is attached to the cylindrical member,
a temporary holding-side lock hole is formed in an outer peripheral surface of the temporary holding insertion part,
the cylindrical member includes a cylindrical member-side lock hole penetrating therethrough in a radial direction, and
when the ring temporary holding jig for temporarily holding the ring is attached to the cylindrical member, the temporary holding insertion part of the ring temporary holding jig is inserted into the internal space of the cylindrical member, the cylindrical member-side lock hole and the temporary holding-side lock hole are aligned with each other, and a lock pin is inserted into the cylindrical member-side lock hole and the temporary holding-side lock hole.

5. The ring assembly method according to claim 4, wherein
the ring temporary holding jig includes a permanent magnet magnetically coupled to the lock pin inserted into the temporary holding-side lock hole.

6. The ring assembly method according to claim 1, wherein
the second ring press member includes a cylindrical part, a lid part for closing an end part of the cylindrical part, and a bolt,
the bolt includes a bolt body with at least a thread part and a head part,
a bolt through-hole is formed in the lid part,
the bolt body of the bolt is inserted into the bolt through-hole,
a thread hole corresponding to the bolt through-hole is formed in the ring temporary holding jig, and
when the ring is slid on the outer peripheral surface of the cylindrical member and then assembled in the ring groove, the ring temporary holding jig is pulled into the second ring press member by fastening the thread part of the bolt to the thread hole of the ring temporary holding jig.

7. A method for manufacturing a shaft assembly comprising:
a cylindrical member including a ring groove formed on an outer peripheral surface; and
a ring assembled in the ring groove, the method comprising:

setting the ring at a small diameter part of a ring temporary holding jig, the ring temporary holding jig including the small diameter part, a tapered part, and a large diameter part in this order, an outer diameter of the small diameter part being smaller than an outer diameter of the large diameter part, an outer peripheral surface of the tapered part being formed to connect an outer peripheral surface of the small diameter part to an outer peripheral surface of the large diameter part, and the outer diameter of the large diameter part being larger than an outer diameter of the cylindrical member;

moving the ring to the large diameter part from the small diameter part through the tapered part by using a first ring press member including a cylindrical shape with a leading end part elastically deformable in a radial direction and including a first length in an axial direction, so that the ring temporary holding jig temporarily holds the ring;

attaching the ring temporary holding jig for temporarily holding the ring to the cylindrical member;

transferring the ring from the large diameter part of the ring temporary holding jig to the outer peripheral surface of the cylindrical member by using a second ring press member, the second ring press member including a cylindrical shape and a second length shorter than the first length in the axial direction; and sliding the ring on the outer peripheral surface of the cylindrical member and then assembling the ring in the ring groove by using the second ring press member.

8. The method according to claim 7, wherein
the first ring press member includes a cylindrical part and a plurality of elastic pieces extending from the cylindrical part.

9. The method according to claim 7, wherein
when the ring is moved relative to the ring temporary holding jig in order to have the ring temporary holding jig to temporarily hold the ring, a ring movement control member including an outer diameter larger than the outer diameter of the large diameter part is made adjacent to the large diameter part of the ring temporary holding jig.

10. The method according to claim 7, wherein
the ring temporary holding jig includes a temporary holding insertion part inserted into an internal space of the cylindrical member when the ring temporary holding jig is attached to the cylindrical member, a temporary holding-side lock hole is formed in an outer peripheral surface of the temporary holding insertion part, the cylindrical member includes a cylindrical member-side lock hole penetrating therethrough in a radial direction, when the ring temporary holding jig for temporarily holding the ring is attached to the cylindrical member, the temporary holding insertion part of the ring temporary holding jig is inserted into the internal space of the cylindrical member, the cylindrical member-side lock hole and the temporary holding-side lock hole are aligned with each other, and a lock pin is inserted into the cylindrical member-side lock hole and the temporary holding-side lock hole.

11. The ring assembly method according to claim 10, wherein
the ring temporary holding jig includes a permanent magnet magnetically coupled to the lock pin inserted into the temporary holding-side lock hole.

12. The method according to claim 7, wherein
the second ring press member includes a cylindrical part, a lid part for closing an end part of the cylindrical part, and a bolt, the bolt includes a bolt body with at least a thread part and a head part, a bolt through-hole is formed in the lid part, the bolt body of the bolt is inserted into the bolt through-hole, a thread hole corresponding to the bolt through-hole is formed in the ring temporary holding jig, and when the ring is slid on the outer peripheral surface of the cylindrical member and then assembled in the ring groove, the ring temporary holding jig is pulled into the second ring press member by fastening the thread part of the bolt to the thread hole of the ring temporary holding jig.

* * * * *